(12) United States Patent
Baek

(10) Patent No.: US 9,278,578 B2
(45) Date of Patent: Mar. 8, 2016

(54) ADHESIVE-TYPE WHEEL BALANCE WEIGHT FOR VEHICLE AND MANUFACTURING METHOD THEREOF

(71) Applicant: In Tae Baek, Ansan-si (KR)

(72) Inventor: In Tae Baek, Ansan-si (KR)

( * ) Notice: Subject to any disclaimer, the term of this patent is extended or adjusted under 35 U.S.C. 154(b) by 9 days.

(21) Appl. No.: 14/500,085

(22) Filed: Sep. 29, 2014

(65) Prior Publication Data

US 2015/0202918 A1   Jul. 23, 2015

(30) Foreign Application Priority Data

Jan. 22, 2014   (KR) .................. 10-2014-0007779

(51) Int. Cl.
*B60B 15/28* (2006.01)
*F16F 15/32* (2006.01)

(52) U.S. Cl.
CPC .............. *B60B 15/28* (2013.01); *F16F 15/328* (2013.01); *B60B 2310/226* (2013.01); *B60B 2900/351* (2013.01); *Y10T 29/496* (2015.01)

(58) Field of Classification Search
CPC ....... F16F 15/328; F16F 15/324; F16F 15/32; B60B 15/28
See application file for complete search history.

(56) References Cited

U.S. PATENT DOCUMENTS

| | | | | |
|---|---|---|---|---|
| 6,286,906 B1 * | 9/2001 | Nagashima | ........... | F16F 15/328 301/5.21 |
| 6,364,421 B1 * | 4/2002 | Pursley | ................ | F16F 15/328 301/5.21 |
| 6,547,338 B2 * | 4/2003 | Gross | .................... | G01M 1/326 301/5.21 |
| 6,592,188 B2 * | 7/2003 | Yamaguchi | ........... | F16F 15/328 301/5.21 |
| 6,619,119 B1 * | 9/2003 | Duggan | ................ | F16F 15/322 464/180 |
| 6,890,038 B1 * | 5/2005 | Lucchesi | ............... | F16F 15/324 152/154.1 |
| 7,044,561 B2 * | 5/2006 | Petchel | ................. | F16F 15/328 301/5.21 |
| 7,055,914 B1 * | 6/2006 | Jenkins | ................. | F16F 15/324 301/5.21 |

* cited by examiner

*Primary Examiner* — John Walters
*Assistant Examiner* — James Triggs
(74) *Attorney, Agent, or Firm* — Bacon & Thomas, PLLC

(57) ABSTRACT

An adhesive-type wheel balance weight for a vehicle and a manufacturing method thereof are provided. The wheel balance weight includes a weight body 10 having a rectangular band structure, a plurality of main through portions 20 spaced apart from one another at equal intervals and penetrating through the weight body vertically in a length direction of the weight body, and having a long hole structure extending in the width direction of the weight body; a plurality of connection portions 30 positioned between both end portions of the weight body in the width direction and both end portions of each of the main through portions in a longer axis direction, and additional through portions 40 provided at both end portions of each of the main through portions in a longer axis direction to narrow a width of each of the connection portions.

6 Claims, 3 Drawing Sheets

ADHESIVE-TYPE WHEEL BALANCE WEIGHT FOR VEHICLE AND MANUFACTURING METHOD THEREOF

FIELD OF THE INVENTION

The present invention relates to an adhesive-type wheel balance weight for a vehicle and a manufacturing method thereof, and more particularly, to an adhesive-type wheel balance weight for a vehicle in which an additional through portion and an auxiliary through portion are added to both end portions of a main through portion of a weight body having a long hole structure in a longer axis direction in order to narrow a width of each of connection portions respectively positioned at both end portions of the main through portion in the longer axis direction, and the connection portions are repeatedly pressed up and down to increase a width of the main through portion in a shorter axis direction and also enhance flexibility of the connection portions, and a manufacturing method thereof.

BACKGROUND OF THE INVENTION

An adhesive-type wheel balance weight for a vehicle generally refers to a component for uniformly maintaining balance of a wheel of a vehicle when the balance is irregular to increase steering stability and prevent partial wearing of a tire, thus enhancing running characteristics.

In general, tires for vehicles are manufactured through a vulcanizing process using a predetermined mold, and the weight of tires is irregularly distributed during a tire forming process, inevitably causing imbalance of tire weight.

Here, the imbalance of tire weight works as a main cause of vibrations of a vehicle body when a wheel rotates, degrading riding quality and also generating partial tire wear, and when the vibrations are excessive or last for a long period of time, continuous fatigue is applied to the vehicle body to cause a gap between components, shorten a lifespan, and reduce steering stability, potentially leading to a risk of security accident.

In order to remove imbalance in distribution of tire weight, a wheel balance weight having an appropriate weight may be installed at a symmetrical point where unequal distribution of tire weight is canceled out to uniformly maintain distribution of tire weight.

For example, a prior art wheel balance weight for a vehicle includes a weight body, a plurality of main through portions having a long hole structure, and a plurality of connection portions positioned in both end portions of the weight body in a width direction.

The weight body is formed of a flexible iron plate material having a rectangular band structure.

In addition, an adhesive unit to be applied to one side of the weight body later in order to install a completed weight body in a wheel of a vehicle, a release paper which covers the adhesive unit to protect the adhesive unit and which is to be removed when the weight body is bonded to a wheel, and the like may be further provided.

The main through portions are spaced apart from one another at equal intervals and penetrate through the weight body vertically in a length direction of the weight body, and have a long hole structure extending in the width direction of the weight body.

The connection portions are positioned between both end portions of the weight body in the width direction and both end portions of each of the main through portions in a longer axis direction (which corresponds to the width direction of the weight body) to enable the weight body to be flexibly bent.

However, since sizes of wheels differ depending on sizes of various types of vehicles, the prior art adhesive-type wheel balance weight for a vehicle needs to have internal curvature sizes corresponding to various wheel sizes, and even though adhesive-type wheel balance weights for vehicles are manufactured to fit the wheel sizes, they are difficult to apply depending on various wheel sizes, so that the wheel balance weight needs to have more flexibility but a separate means for narrowing a width of the connection portions is not provided at all, degrading flexibility and bending characteristics of the connection portions. As a result, a contact surface with respect to a tire wheel is reduced to degrade adhesion, or the like.

SUMMARY OF THE INVENTION

It is, therefore, an object of the present invention to provide an adhesive-type wheel balance weight for a vehicle in which an additional through portion and an auxiliary through portion are added to both end portions of a main through portion of a weight body having a long hole structure in a longer axis direction in order to narrow a width of each of connection portions respectively positioned at both end portions of the main through portion in the longer axis direction, whereby a width of the connection portions is maximally minimized to enhance flexibility and bending characteristics of the connection portions in a length direction, resulting in ease of installation of a fine adjustment weight in the main through portion and also increase in a contact surface with respect to a tire wheel and enhancement of adhesion accordingly, and a manufacturing method thereof.

Another object of the present invention is to provide an adhesive-type wheel balance weight for a vehicle in which the connection portions are pressed up and down repeatedly to have a W shape in a cross-section thereof, resulting in an increase a width of the main through portion in a shorter axis direction, ease of assembling of a fine adjustment weight to the main through portion, and enhancement of flexibility of the connection portions, and a manufacturing method thereof.

According to one aspect of the present invention, there is provided an adhesive-type wheel balance weight for a vehicle, including: a weight body having a rectangular band structure; a plurality of main through portions spaced apart from one another at equal intervals and penetrating through the weight body vertically in a length direction of the weight body, and having a long hole structure extending in the width direction of the weight body; and a plurality of connection portions positioned between both end portions of the weight body in the width direction and both end portions of each of the main through portions in a longer axis direction, wherein the adhesive-type wheel balance weight for a vehicle further includes: additional through portions provided at both end portions of each of the main through portions in a longer axis direction; and auxiliary through portions are provided at both end portions of the additional through portions in the longer axis direction to further reduce the area of the connection portions, wherein the auxiliary through portions have a through hole structure penetrating from both end portions of the additional through portions in the longer axis direction toward the connection portions and having a small band shape smaller than the width of the additional through portions in the shorter axis direction.

Further, the additional through portions may extend from a special shape of the main through portions from both end portions of the main through portion in the longer axis direction and penetrate through the main through portions, while maintaining a special shape (an oval angular shape, an oval angular shape, or the like) similar to that of the main through portions.

That is, the additional through portions are formed by cutting away the weight body from both end portions of the main through portions in the longer axis direction such that the long hole structure of the main through portions extends by a predetermined length in the longer axis direction.

According to another aspect of the present invention, there is provided a method of manufacturing an adhesive-type wheel balance weight for a vehicle, the method including: forming a plurality of main through portions to penetrate a prepared plate member vertically at equal intervals in a length direction and a width direction of the plate member; forming additional through portions to extend both end portions of the main through portions in a longer axis direction; cutting between the additional through portions adjacently disposed to be spaced apart from one another in the width direction to have a predetermined width and form connection portions between both end portions of the width and both end portions of the additional through portions in the longer axis direction, to separate the weight body; and repeatedly pressing up and down the connection portions at both ends of the separated weight body in the width direction to increase a width of the main through portions in the shorter axis direction.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Hereinafter, embodiments of the present invention will be described in detail with the accompanying drawings.

Figure 1:
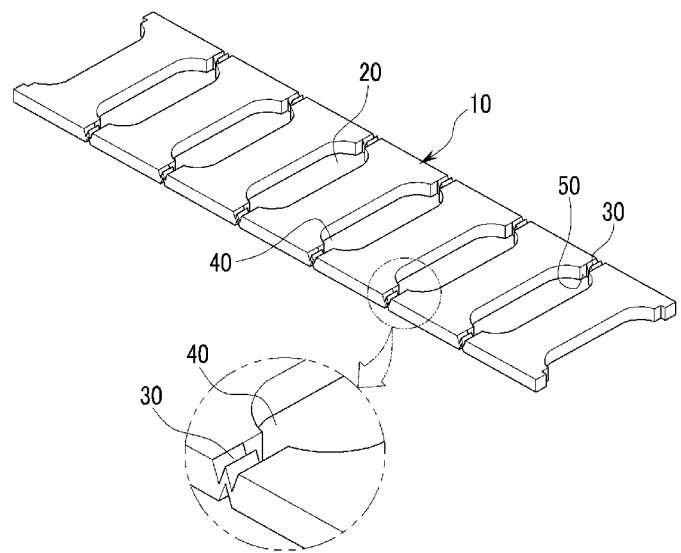
FIG. 1 is a perspective view illustrating an adhesive-type wheel balance weight for a vehicle according to an embodiment of the present invention.
Figure 2:
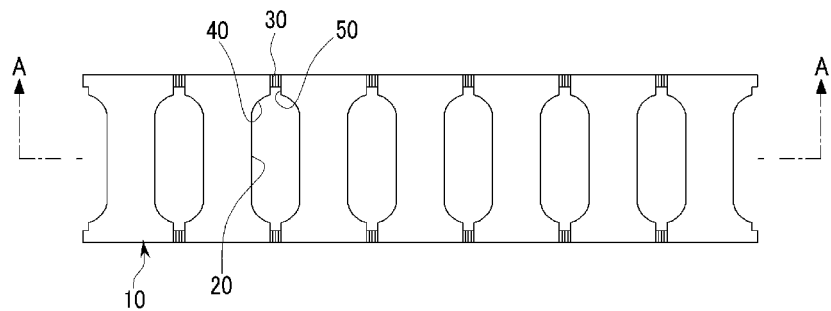
FIG. 2 is a plan view illustrating the adhesive-type wheel balance weight for a vehicle according to an embodiment of the present invention.
Figure 3:
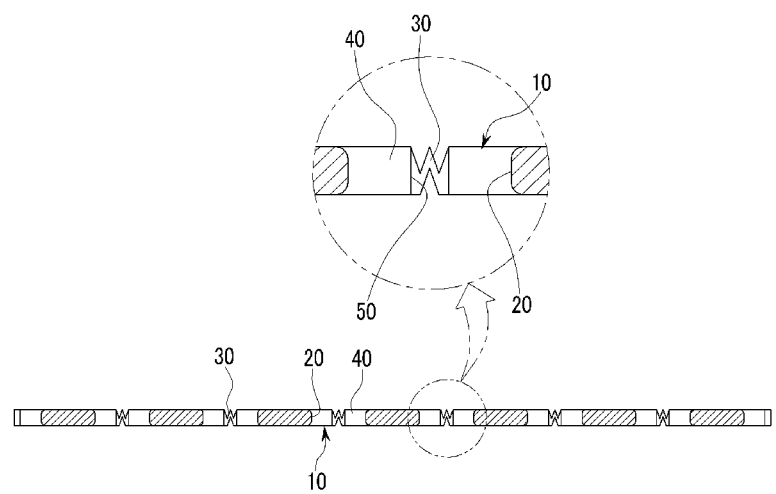
FIG. 3 is a cross-sectional view taken along line A-A of FIG. 2.
Figure 4:
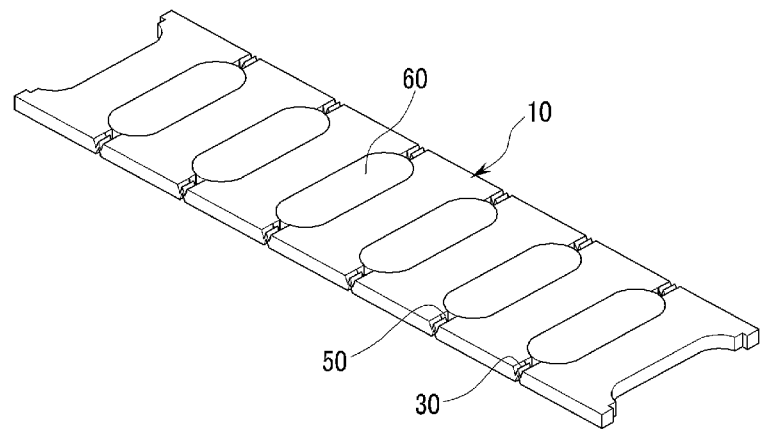
FIG. 4 is a perspective view illustrating a state in which a fine adjustment weight is installed in a main through portion of the adhesive-type wheel balance weight for a vehicle according to an embodiment of the present invention.
Figure 5:
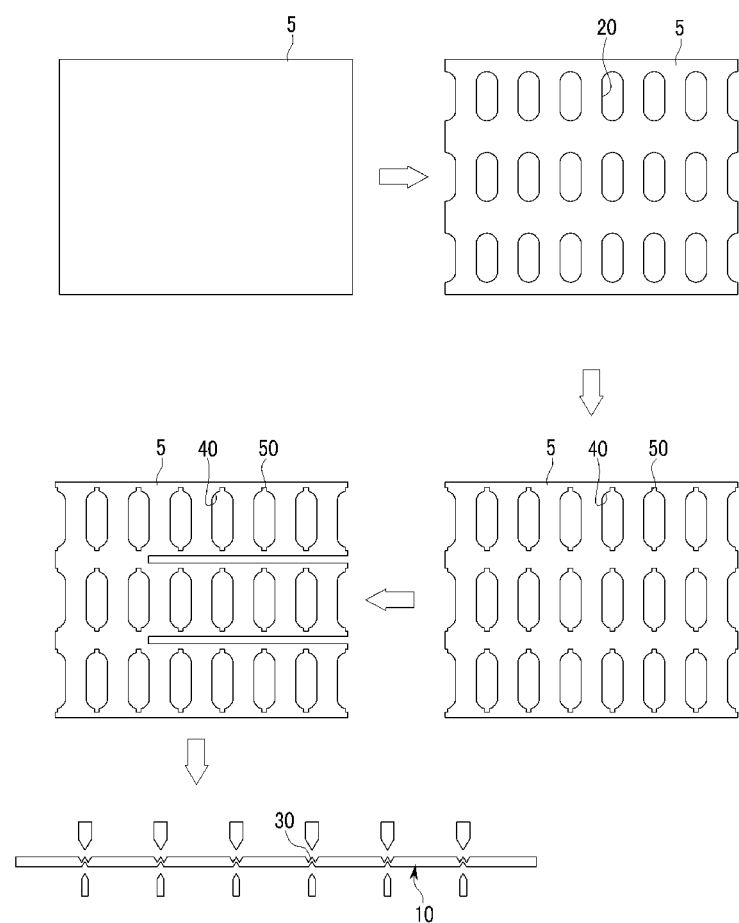
FIG. 5 is a view illustrating sequential processes of manufacturing an adhesive-type wheel balance weight for a vehicle according to an embodiment of the present invention.

As illustrated in FIGS. 1 to 5, an adhesive-type wheel balance weight for a vehicle according to an embodiment of the present invention includes a weight body 10, a plurality of main through portions 20 having a long hole structure, a plurality of connection portions 30 positioned at both end portions of the weight body 10 in a width direction, and additional through portions 40 provided at both end portions of each of the main through portions 20 in a longer axis direction.

The weight body 10 is formed of a flexible thin iron plate material having a rectangular band structure.

In addition, an adhesive unit (not shown) to be applied to one side of the weight body 10 later in order to install a completed weight body 10 in a wheel of a vehicle, a release paper (not shown) which covers the adhesive unit to protect the adhesive unit and which is to be removed when the weight body 10 is bonded to a wheel, and the like may be further provided.

The main through portions 20 are spaced apart from one another at equal intervals, penetrate through the weight body 10 vertically in a length direction of the weight body 10, and have a long hole structure extending in the width direction of the weight body 10.

The connection portions 30 are positioned between both end portions of the weight body 10 in the width direction and both end portions of each of the main through portions 20 in a longer axis direction (which corresponds to the width direction of the weight body) to enable the weight body 10 to be flexibly bent.

Further, the additional through portions 40 penetrate both end portions of each of the main through portions 20 in the longer axis direction in order to narrow the width of each of the connection portions 30 and facilitate assembling of a fine adjustment weight.

Here, the additional through portions 40 may extend from a special shape of the main through portions 20 from both end portions of the main through portion 20 in the longer axis direction and penetrate through the main through portions 20, while maintaining a special form longer than the main through portions 20 in the width direction. As the special shape, an oval shape, an oval angular shape, or the like may be considered (in the drawings, the special shape is illustrated as an oval shape).

In addition, auxiliary through portions 50 are provided at both end portions of the additional through portions 40 in the longer axis direction in order to further decrease the area of the connection portions 30.

Here, the auxiliary through portions 50 may have a through hole structure penetrating from both end portions of the additional through portions 40 in the longer axis direction toward the connection portions 30 and having a small band shape smaller than the width of the additional through portions 40 in the shorter axis direction (which corresponds to the length direction of the weight body).

Further, the connection portions 30 have an approximately W-shape in a cross-section thereof formed by pressing up and down repeatedly (up-setting process).

Here, during the up-setting process, when the connection portions 30 are repeatedly pressed up and down, both sides thereof are increased based on the point which is repeatedly pressed up and down in terms of qualities of metal (ductility), and thus, obviously, a width of the main through portions 20 in the shorter axis direction (which corresponds to the length direction of the weight body) is also increased.

Meanwhile, fine adjustment weights 60 may be disposed within the main through holes 20 to fine-adjust an overall weight of the weight body 10.

Here, the fundamental reason for forming the main through holes 20 is just to install the fine adjustment weights 60 on the weight body 10, and the fine adjustment weights 60 may use a scrap inevitably generated in the process of penetrating the main through holes 20.

Further, the fine adjustment weights 60 generated by the scrap are difficult to install directly in the main through holes 20, and thus, broaching and up-setting processes are performed as mentioned below.

Such fine adjustment weights 60 have a special shape having a size corresponding to inner circumferential surfaces of the main through holes 20, and thus, the fine adjustment weights 60 have a separable structure that can be loosely inserted into the main through holes 20. A plurality of fine adjustment weights 60 may be prepared to be injected into all the main through holes 20, respectively.

Further, with the fine adjustment weights 60 disposed within the main through holes 20, in order for the fine adjustment weights 60 to be attached with an adhesive tape, the fine adjustment weights 60 are pressed with a separate jig (not shown). Then, upper end portions at both sides of the fine adjustment weights 60 are pressed and the adhesive tape covers one side of the fine adjustment weights 60, and thus, the fine adjustment weights 60 can be firmly fixed.

A method for manufacturing an adhesive-type wheel balance weight for a vehicle according to an embodiment of the present invention having the foregoing configuration will now be described. First, a plurality of main through portions 20 are formed to penetrate a prepared plate member 5 vertically at equal intervals in a length direction and a width direction of the plate member 5 (piercing process).

In this case, the fine adjustment weights 60 are generated.

Thereafter, additional through portions 40 are formed to facilitate assembly of the fine adjustment weights 60 by extending both end portions of the main through portions 20 in a longer axis direction (broaching process).

Further, in order to enhance flexibility of the connection portions 30, auxiliary through portions 50 are formed to extend in a penetrating manner from both end portions of the additional through portions 40 in the longer axis direction toward a width direction of the weight body 10.

Thereafter, cutting between the additional through portions 40 adjacently disposed to be spaced apart from one another in the width direction to have a predetermined width and form predetermined connection portions 30 between both end portions of the width and both end portions of the additional through portions 40 in the longer axis direction, thus separating the weight body 10 (separating process).

Subsequently, the connection portions 30 at both ends of the separated weight body 10 in the width direction are pressed up and down to increase a width of the main through portions 20 in the shorter axis direction (up-setting process).

Meanwhile, the connection portions 30 have an approximately W shape in cross-section thereof through pressing repeatedly performed up and down, to have enhanced flexibility accordingly.

Finally, the weight of an actually used weight has various specifications ranging from 5 to 100 grams, and thus, the connection portions are cut to have a required weight.

An adhesive unit and a release paper are attached to one side of the completed weight body 10 and, as necessary, the fine adjustment weights 60 are installed in the main through portions 20, thus finally completing manufacturing of the wheel balance weight for a vehicle according to the present invention.

As described above, in the adhesive-type wheel balance weight for a vehicle and the manufacturing method thereof according to an embodiment of the present invention, since the additional through portion and the auxiliary through portion are added to both end portions of a main through portion of a weight body having a long hole structure in a longer axis direction in order to narrow a width of each of the connection portions respectively positioned at both end portions of the main through portion in the longer axis direction, a width of the connection portions can be minimized to enhance flexibility and bending characteristics of the connection portions in a length direction, and as a result, installation of a fine adjustment weight in the main through portion is facilitated, a contact surface with respect to a tire wheel having various sizes can be increased, and adhesion can be enhanced accordingly.

Moreover, the connection portions are pressed up and down repeatedly to have a W shape in a cross-section thereof, and as a result, a width of the main through portion in a shorter axis direction can be increased, and thus, assembling of a fine adjustment weight to the main through portion can be facilitated and flexibility of the connection portions can also be enhanced.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An adhesive-type wheel balance weight for a vehicle, comprising:
   a weight body having a rectangular band structure;
   a plurality of main through portions spaced apart from one another at equal intervals and penetrating through the weight body vertically in a length direction of the weight body, and having a long hole structure extending in the width direction of the weight body; and
   a plurality of connection portions positioned between both end portions of the weight body in the width direction and both end portions of each of the main through portions in a longer axis direction,
   wherein the adhesive-type wheel balance weight for a vehicle further comprises:
   additional through portions provided at both end portions of each of the main through portions in a longer axis direction; and
   auxiliary through portions are provided at both end portions of the additional through portions in the longer axis direction to further reduce the area of the connection portions,
   wherein the auxiliary through portions have a through hole structure penetrating from both end portions of the additional through portions in the longer axis direction toward the connection portions and having a small band shape smaller than the width of the additional through portions in the shorter axis direction.

2. The adhesive-type wheel balance weight for a vehicle of claim 1, wherein the additional through portions are formed by cutting away the weight body from both end portions of the main through portions in the longer axis direction such that the long hole structure of the main through portions extends by a predetermined length in the longer axis direction.

3. The adhesive-type wheel balance weight for a vehicle of claim 1 or 2, wherein sectional structures of the connection portions have a W structure formed through pressing up and down repeatedly.

4. A method of manufacturing an adhesive-type wheel balance weight for a vehicle, the method comprising:
   forming a plurality of main through portions to penetrate a prepared plate member vertically at equal intervals in a length direction and a width direction of the plate member;
   forming additional through portions to extend both end portions of the main through portions in a longer axis direction;
   cutting between the additional through portions adjacently disposed to be spaced apart from one another in the width direction to have a predetermined width and form connection portions between both end portions of the width and both end portions of the additional through portions in the longer axis direction, to separate the weight body; and repeatedly pressing up and down the connection portions at both ends of the separated weight body in the width direction to increase a width of the main through portions in the shorter axis direction.

5. The method of claim 4, further comprising:

forming auxiliary through portions extending in a penetrating manner from both end portions of the additional through portions in the longer axis direction toward a width direction of the weight body to enhance flexibility of the connection portions.

6. The method of claim 5, wherein the connection portions have a W shape in cross-section thereof through pressing repeatedly performed up and down.

* * * * *